United States Patent
Zhang et al.

(10) Patent No.: US 12,487,797 B2
(45) Date of Patent: Dec. 2, 2025

(54) SMART PROGRAMMING METHOD FOR INTEGRATED CNC-ROBOT

(71) Applicant: Siemens Aktiengesellschaft, Munich (DE)

(72) Inventors: Bin Zhang, Beijing (CN); Armin Roux, Erlangen (DE); Ye Hu, Beijing (CN); Shun Jie Fan, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 961 days.

(21) Appl. No.: 17/671,666

(22) Filed: Feb. 15, 2022

(65) Prior Publication Data
US 2022/0269240 A1    Aug. 25, 2022

(30) Foreign Application Priority Data
Feb. 25, 2021 (CN) .......................... 202110211608.9

(51) Int. Cl.
G06F 8/34 (2018.01)
G05B 19/4063 (2006.01)
G05B 19/4069 (2006.01)

(52) U.S. Cl.
CPC .......... *G06F 8/34* (2013.01); *G05B 19/4063* (2013.01); *G05B 19/4069* (2013.01);
(Continued)

(58) Field of Classification Search
CPC ........... G05B 19/4069; G05B 19/4063; G05B 2219/32351; G05B 2219/36017; G05B 2219/40314; G05B 19/18–41; G06F 8/34
See application file for complete search history.

(56) References Cited

U.S. PATENT DOCUMENTS

2013/0338809 A1* 12/2013 Kume ................ G05B 19/4155
                                                       700/97
2017/0235300 A1   8/2017 Maruno et al.
(Continued)

FOREIGN PATENT DOCUMENTS

CN         111381815 A      7/2020
WO    WO 2016053337 A1      4/2016

OTHER PUBLICATIONS

Unknown, "Visual Programming Language" (dated Feb. 10, 2021 (Feb. 10, 2021)) from archive.org, Wikipedia (Year: 2021).*

*Primary Examiner* — Rehana Perveen
*Assistant Examiner* — John P Hocker
(74) *Attorney, Agent, or Firm* — Harness, Dickey & Pierce, P.L.C.

(57) ABSTRACT

A programming method is for a numerical control machine tool system including a mobile terminal, a controller, a robot, and a numerical control machine tool. The mobile terminal is wirelessly connected to the controller configured to control the robot and the numerical control machine tool, and the robot and the numerical control machine tool being configured to work cooperatively to process a workpiece. The method includes: loading, at the mobile terminal, a preset motion model of the robot and the numerical control machine tool, the preset motion model being a plurality of graphical functional modules and a connection between them; receiving a graphical programming instruction for a user to configure the preset motion model using the mobile terminal; and converting the graphical programming instruction into G-code, where the G-code is used by the controller to control the robot and the numerical control machine tool to process the workpiece.

13 Claims, 6 Drawing Sheets

(52) U.S. Cl.
CPC .............. *G05B 2219/32351* (2013.01); *G05B 2219/36017* (2013.01); *G05B 2219/40314* (2013.01)

(56) References Cited

U.S. PATENT DOCUMENTS

| | | | |
|---|---|---|---|
| 2017/0249129 A1* | 8/2017 | McDaniel | G05B 19/0426 |
| 2018/0239312 A1* | 8/2018 | Lee | G05B 13/04 |
| 2019/0381670 A1* | 12/2019 | Correll | B25J 15/10 |
| 2021/0026327 A1* | 1/2021 | Thenoz | G05B 19/4097 |
| 2021/0026606 A1* | 1/2021 | Kessler | G10L 15/22 |
| 2022/0266527 A1* | 8/2022 | Negugogor | B29C 64/393 |
| 2024/0075618 A1* | 3/2024 | Li | B25J 9/1664 |

* cited by examiner

| No. | G code | | | | description |
|---|---|---|---|---|---|
| N60 | S800 M3 M08 | + | ⌀ | × | Spindle speed |
| N70 | G00 X52.0 Z2 | + | ⌀ | × | Return to safe point |
| N80 | G70396("22.0G_F",2.0,2.0,1.0,0.35,0.2,0.1,0.0,0.2) | + | ⌀ | × | Contour machining |
| xxx | xxxxxx | + | ⌀ | × | xxxxxxxxx |
| xxx | xxxxxx | + | ⌀ | × | xxxxxxxxx |
| xxx | xxxxxx | + | ⌀ | × | xxxxxxxxx |
| xxx | xxxxxx | + | ⌀ | × | xxxxxxxxx ^ |
| xxx | xxxxxx | + | ⌀ | × | xxxxxxxxx |
| xxx | xxxxxx | + | ⌀ | × | xxxxxxxxx |
| xxx | xxxxxx | + | ⌀ | × | xxxxxxxxx |
| xxx | xxxxx | | | | |
| | XXXX | | | | XXXX |

SMART PROGRAMMING METHOD FOR INTEGRATED CNC-ROBOT

PRIORITY STATEMENT

The present application hereby claims priority under 35 U.S.C. § 119 to Chinese patent application number CN 202110211608.9 filed Feb. 25, 2021, the entire contents of which are hereby incorporated herein by reference.

FIELD

Example embodiments of the invention generally relate to the field of industrial digitalization, and in particular to a programming method and apparatus for a numerical control machine tool system.

BACKGROUND

Industrial digitalization is digital transformation of factories to improve the transparency and operational efficiency of the factories. A numerical control machine tool system includes a computer numerical control machine tool (CNC machine tool) and a robot. The numerical control machine tool and the robot move cooperatively to process a workpiece blank in the numerical control machine tool. Research and development personnel program the numerical control machine tool and the robot to move according to a desired program, so as to process a desired workpiece.

In the prior art, the research and development personnel program, on a personal computer (PC), a control system in a factory. A location of the personal computer is fixed, resulting in lack of flexibility and convenience in programming. Moreover, it is required to analyze and model an environment of the factory.

SUMMARY

The inventors discovered that the analyzing and modeling of the environment of the factory consumes huge time and economic costs. In addition, the inventors discovered that when the environment of the factory changes, the control system needs to be reprogrammed to adapt to the environmental changes, which also requires additional time and economic costs.

Embodiments of the present invention provide a programming method and apparatus for a numerical control machine tool system, so as to improve the automation degree of programming of the numerical control machine tool system and reduce the time and economic costs of the numerical control machine tool system.

In at least one embodiment, the present invention proposes a programming method for a numerical control machine tool system, the numerical control machine tool system including a mobile terminal, a controller, a robot, and a numerical control machine tool, the mobile terminal being wirelessly connected to the controller, the controller being configured to control the robot and the numerical control machine tool, and the robot and the numerical control machine tool being configured to work cooperatively to process a workpiece, where the programming method includes: loading, at the mobile terminal, a preset motion model of the robot and the numerical control machine tool, where the preset motion model is a plurality of graphical functional modules and a connection between the plurality of graphical functional modules; receiving a graphical programming instruction for a user to configure the preset motion model using the mobile terminal; and converting the graphical programming instruction into G-code, where the G-code is used by the controller to control the robot and the numerical control machine tool to process the workpiece. Therefore, this embodiment of the present invention provides the programming method for a numerical control machine tool system, in which the preset motion model of the robot and the numerical control machine tool is loaded at the mobile terminal, and the graphical programming instruction for the user to configure the preset motion model using the mobile terminal is received. The user can configure the preset motion model and does not need to configure the functional modules and the connection relationship between the functional modules from scratch, which can significantly improve the efficiency of graphical programming and increase the degree of automation.

At least one embodiment of the present invention further proposes a programming apparatus for a numerical control machine tool system, the numerical control machine tool system including a mobile terminal, a controller, a robot, and a numerical control machine tool, the mobile terminal being wirelessly connected to the controller, the controller being configured to control the robot and the numerical control machine tool, and the robot and the numerical control machine tool being configured to work cooperatively to process a workpiece, where the programming apparatus includes: a loading module loading, at the mobile terminal, a preset motion model of the robot and the numerical control machine tool, where the preset motion model is a plurality of graphical functional modules and a connection between the plurality of graphical functional modules; a receiving module receiving a graphical programming instruction for a user to configure the preset motion model using the mobile terminal; and a conversion module converting the graphical programming instruction into G-code, where the G-code is used by the controller to control the robot and the numerical control machine tool to process the workpiece.

At least one embodiment of the present invention further proposes an electronic device, including a processor, a memory, and instructions stored in the memory, where when the instructions are executed by the processor, a method as described in at least one embodiment is implemented.

At least one embodiment of the present invention further proposes a computer-readable storage medium having computer instructions stored thereon, wherein when the computer instructions are run, a method as described in at least one embodiment is performed.

At least one embodiment of the present invention further proposes a programming method for a numerical control machine tool system, the numerical control machine tool system including a mobile terminal, a controller, a robot, and a numerical control machine tool, the mobile terminal being wirelessly connected to the controller, the controller being configured to control the robot and the numerical control machine tool, and the robot and the numerical control machine tool being configured to work cooperatively to process a workpiece, wherein the programming method comprises:

loading, at the mobile terminal, a preset motion model of the robot and the numerical control machine tool, the preset motion model being a plurality of graphical functional modules and a connection between the plurality of graphical functional modules;

receiving a graphical programming instruction for a user to configure the preset motion model using the mobile terminal; and converting the graphical programming instruction into G-code, wherein the G-code is usable by the controller to control the robot and the numerical control machine tool to process the workpiece.

At least one embodiment of the present invention further proposes a programming apparatus for a numerical control machine tool system, the numerical control machine tool system including a mobile terminal, a controller, a robot, and a numerical control machine tool, the mobile terminal being wirelessly connected to the controller, the controller being configured to control the robot and the numerical control machine tool, and the robot and the numerical control machine tool being configured to work cooperatively to process a workpiece, wherein the programming apparatus comprises:

a loading module to load, at the mobile terminal, a preset motion model of the robot and the numerical control machine tool, the preset motion model being a plurality of graphical functional modules and a connection between the plurality of graphical functional modules;

a receiving module to receive a graphical programming instruction for a user to configure the preset motion model using the mobile terminal; and a conversion module to convert the graphical programming instruction into G-code, the G-code being usable by the controller to control the robot and the numerical control machine tool to process the workpiece.

At least one embodiment of the present invention further proposes an electronic device, comprising:

a processor;

a memory storing instructions, wherein upon the instructions being executed by the processor, a method is implemented comprising:

loading, at the mobile terminal, a preset motion model of the robot and the numerical control machine tool, the preset motion model being a plurality of graphical functional modules and a connection between the plurality of graphical functional modules;

receiving a graphical programming instruction for a user to configure the preset motion model using the mobile terminal; and converting the graphical programming instruction into G-code, wherein the G-code is usable by the controller to control the robot and the numerical control machine tool to process the workpiece.

At least one embodiment of the present invention further proposes a non-transitory computer-readable storage medium storing computer instructions, wherein upon the computer instructions being run, the method of an embodiment is performed.

BRIEF DESCRIPTION OF THE DRAWINGS

The following accompanying drawings are merely intended to illustratively describe and explain the present invention and do not limit the scope of the present invention. In the figures.

REFERENCE NUMERALS

100 Programming method
110-140 Steps
200 Numerical control machine tool system
201 Mobile terminal
202 Control board
203 Controller
204 Driver
205 Robot
206 Numerical control machine tool
410 Cloud
411 Computing service
412 Database service
413 Simulation service
420 Mobile terminal
421 Preset module
421a Machine tool parameter module
421b Robotic arm parameter module
421c Gripper parameter module
421d Workpiece blank parameter module
421e Initial location parameter module
422 Graphical programming module
422a Computer numerical control technology module
422b Robot motion process module
422c Simulation demonstration module
430 Field environment
431 Controller
432 Driver
433 Robot
434 Numerical control machine tool
500 Programming apparatus
510 Loading module
520 Receiving module
530 Conversion module
600 Electronic device
610 Processor
620 Memory

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. At least one embodiment of the present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

In at least one embodiment, the present invention proposes a programming method for a numerical control machine tool system, the numerical control machine tool system including a mobile terminal, a controller, a robot, and a numerical control machine tool, the mobile terminal being wirelessly connected to the controller, the controller being configured to control the robot and the numerical control machine tool, and the robot and the numerical control machine tool being configured to work cooperatively to process a workpiece, where the programming method includes: loading, at the mobile terminal, a preset motion model of the robot and the numerical control machine tool, where the preset motion model is a plurality of graphical functional modules and a connection between the plurality of graphical functional modules; receiving a graphical programming instruction for a user to configure the preset motion model using the mobile terminal; and converting the graphical programming instruction into G-code, where the G-code is used by the controller to control the robot and the numerical control machine tool to process the workpiece. Therefore, this embodiment of the present invention provides the programming method for a numerical control machine tool system, in which the preset motion model of the robot and the numerical control machine tool is loaded at the mobile terminal, and the graphical programming instruction for the user to configure the preset motion model using the mobile terminal is received. The user can configure the preset motion model and does not need to configure the functional modules and the connection relationship between the functional modules from scratch, which can significantly improve the efficiency of graphical programming and increase the degree of automation.

In an embodiment of the present invention, the programming method further includes: generating, according to the graphical programming instruction, a simulation animation corresponding to the graphical programming instruction, and sending the simulation animation to the mobile terminal for display. Therefore, after the user performs graphical programming, the simulation animation is generated and displayed. The user can directly browse an execution result after the graphical programming, and at the same time check whether there are loopholes or errors in the graphical programming instruction.

In an embodiment of the present invention, the programming method includes: sending the graphical programming instruction to a cloud, generating, on the cloud according to the graphical programming instruction, the simulation animation corresponding to the graphical programming instruction, and sending, by the cloud, the simulation animation to the mobile terminal for display. Therefore, the simulation animation is generated on the cloud, and the cloud can provide massive services and computing capabilities, making the generation of the simulation animation more accurate and richer.

In an embodiment of the present invention, converting the graphical programming instruction into G-code includes: in response to the user's confirmation of the simulation animation at the mobile terminal, converting the graphical programming instruction into the G-code. Therefore, the introduction of the user's confirmation of the simulation animation can improve the accuracy of programming and reduce a possibility of loopholes and errors in graphical programming.

In an embodiment of the present invention, the programming method further includes: obtaining a sensing signal acquired by a sensor of the robot and the numerical control machine tool; and updating the simulation animation of the robot and the numerical control machine tool based on the sensing signal. Therefore, the simulation animation of the robot and the numerical control machine tool is updated based on the sensing signal, and real-time feedback and closed-loop control of the robot and the numerical control machine tool can be achieved.

In an embodiment of the present invention, the numerical control machine tool system further includes an edge computing device, and the programming method includes: receiving, at the mobile terminal, the preset motion model of the robot and the numerical control machine tool that is sent by the edge computing device, generating, at the edge computing device according to the graphical programming instruction, the simulation animation corresponding to the graphical programming instruction, and sending the simulation animation to the mobile terminal for display. Therefore, the preset motion model is stored on the edge computing device, and the simulation animation is generated at the edge computing device, which can reduce network latency and improve programming efficiency.

At least one embodiment of the present invention further proposes a programming apparatus for a numerical control machine tool system, the numerical control machine tool system including a mobile terminal, a controller, a robot, and a numerical control machine tool, the mobile terminal being wirelessly connected to the controller, the controller being configured to control the robot and the numerical control machine tool, and the robot and the numerical control machine tool being configured to work cooperatively to process a workpiece, where the programming apparatus includes: a loading module loading, at the mobile terminal, a preset motion model of the robot and the numerical control machine tool, where the preset motion model is a plurality of graphical functional modules and a connection between the plurality of graphical functional modules; a receiving module receiving a graphical programming instruction for a user to configure the preset motion model using the mobile terminal; and a conversion module converting the graphical programming instruction into G-code, where the G-code is used by the controller to control the robot and the numerical control machine tool to process the workpiece.

In an embodiment of the present invention, the programming apparatus further includes: generating, according to the graphical programming instruction, a simulation animation corresponding to the graphical programming instruction, and sending the simulation animation to the mobile terminal for display.

In an embodiment of the present invention, the programming apparatus includes: sending the graphical programming instruction to a cloud, generating, on the cloud according to the graphical programming instruction, the simulation animation corresponding to the graphical programming instruction, and sending, by the cloud, the simulation animation to the mobile terminal for display.

In an embodiment of the present invention, the conversion module converting the graphical programming instruction into G-code includes: in response to the user's confirmation of the simulation animation at the mobile terminal, converting the graphical programming instruction into the G-code.

In an embodiment of the present invention, the programming apparatus further includes: obtaining a sensing signal acquired by a sensor of the robot and the numerical control machine tool; and updating the simulation animation of the robot and the numerical control machine tool based on the sensing signal.

In an embodiment of the present invention, the numerical control machine tool system further includes an edge computing device, and the programming apparatus includes: receiving, at the mobile terminal, the preset motion model of the robot and the numerical control machine tool that is sent by the edge computing device, generating, at the edge computing device according to the graphical programming instruction, the simulation animation corresponding to the graphical programming instruction, and sending the simulation animation to the mobile terminal for display.

At least one embodiment of the present invention further proposes an electronic device, including a processor, a memory, and instructions stored in the memory, where when the instructions are executed by the processor, a method as described in at least one embodiment is implemented.

At least one embodiment of the present invention further proposes a computer-readable storage medium having computer instructions stored thereon, wherein when the computer instructions are run, a method as described in at least one embodiment is performed.

For a clearer understanding of the technical features, objectives, and effects of the present invention, specific implementations of the present invention are now described with reference to the accompanying drawings.

In the following description, many specific details are set forth in order to fully understand the present invention, but the present invention can also be implemented in other ways different from those described herein. Therefore, the present invention is not limited by the specific embodiments disclosed below.

As shown in the present application and the claims, unless the context expressly indicates otherwise, the words "a", "an", "said", and/or "the" do not specifically refer to the singular, but may also include the plural. Generally, the terms "include" and "comprise" only suggest that the expressly identified steps and elements are included, but these steps and elements do not constitute an exclusive list, and the method or device may further include other steps or elements.

Figure 2:
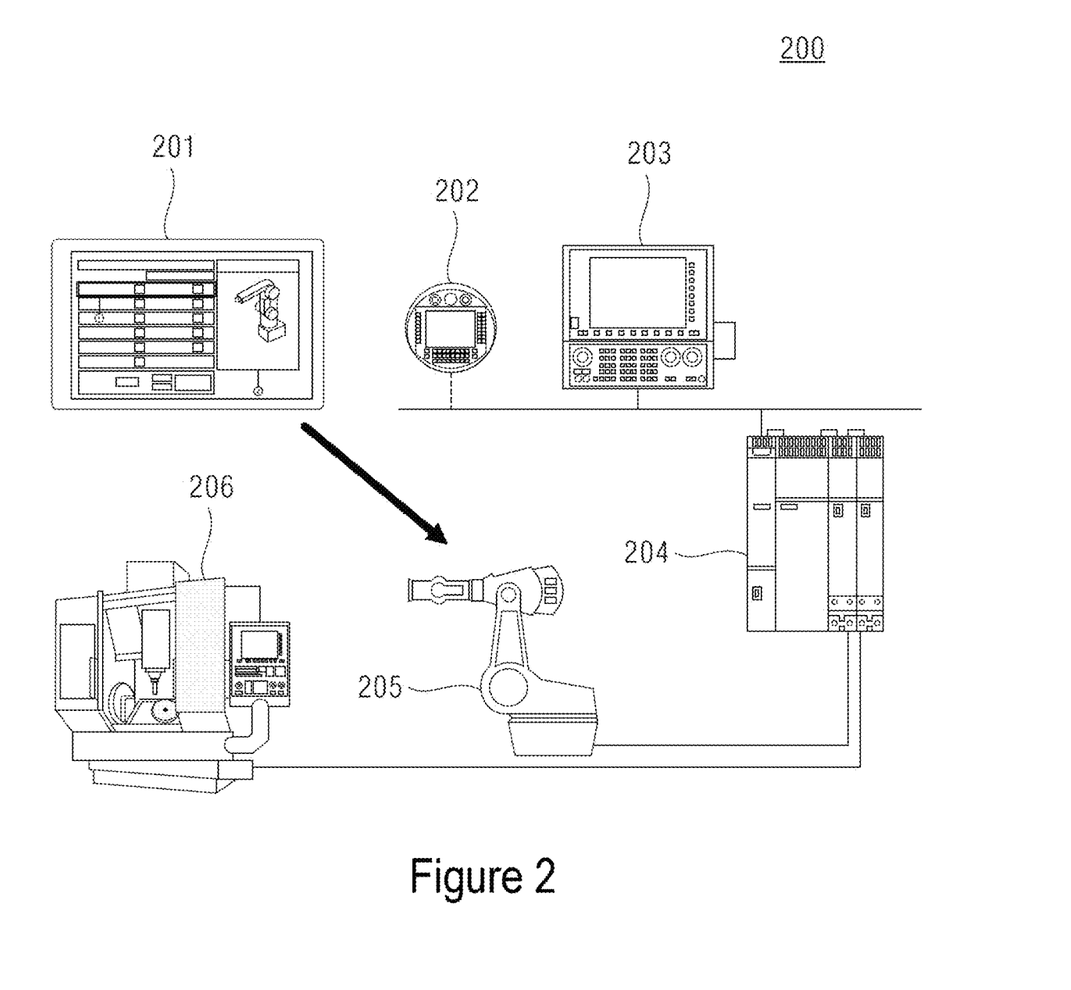
FIG. 2 is a schematic diagram of a numerical control machine tool system according to an embodiment of the present invention.

FIG. 2 is a schematic diagram of a numerical control machine tool system 200 according to an embodiment of the present invention. As shown in FIG. 2, the numerical control machine tool system 200 includes a mobile terminal 201, a control board 202, a controller 203, a driver 204, a robot 205, and a numerical control machine tool 206.

A user can hold the mobile terminal 201 with a hand, browse content displayed by the mobile terminal 201, and perform a touch operation on the content displayed by the mobile terminal 201. Preferably, the mobile terminal 201 may be a tablet computer installed with an Android operating system. The control board 202 and the controller 203 constitute a field control part of the numerical control machine tool system. The control board 202 and the controller 203 are both connected to a field communication bus and communicate with the driver 204 in the numerical control machine tool system 200 using an industrial communication protocol. Compared with the controller 203, the control board 202 has a smaller volume and weight and can move within a limited range. In this embodiment of the present invention, the controller 203 is also a computer numerical controller (CNC), which controls the robot 205 and the numerical control machine tool 206 according to G-code. In some embodiments, the control board 202 may be omitted. The driver 204 is connected to the controller 203 using the field communication bus and is configured to drive the robot 205 and the numerical control machine tool 206 according to the controller 203. The robot 205 and the numerical control machine tool 206 work cooperatively to process a workpiece. For example, the robot 205 can grip, move, and place the workpiece, and the numerical control machine tool 206 can cut, mill, and polish the workpiece. The robot 205 and the numerical control machine tool 206 perform a plurality of actions cooperatively to complete processing of the workpiece. The robot 205 includes structures such as a base, a robotic arm, and a gripper. The numerical control machine tool 206 includes a processing table, a processing head, a processing room, and the like.

An embodiment of the present invention provides a programming method for a numerical control machine tool system, so as to improve the automation degree of programming of the numerical control machine tool system and reduce the time and economic costs of the numerical control machine tool system, that is, automatically and efficiently generate G-code for workpiece processing.

Figure 1:
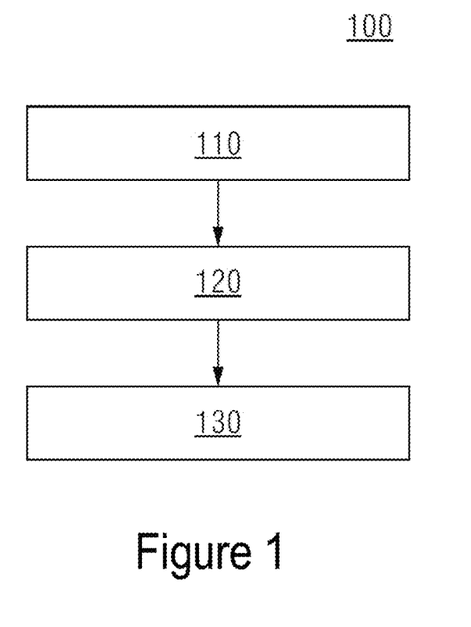
FIG. 1 is a flowchart of a programming method for a numerical control machine tool system according to an embodiment of the present invention.

FIG. 1 is a flowchart of a programming method 100 for a numerical control machine tool system according to an embodiment of the present invention. The programming method 100 shown in FIG. 1 can be performed in the numerical control machine tool system 200 shown in FIG. 2. As shown in FIG. 1, the programming method 100 includes the following steps.

Step 110: Load, at the mobile terminal, a preset motion model of the robot and the numerical control machine tool, where the preset motion model is a plurality of graphical functional modules and a connection between the plurality of graphical functional modules.

Motion data of the robot 205 and the numerical control machine tool 206 in different modes can be collected, and the preset motion model can be constructed based on the motion data. For example, a motion model of the robot 205 is gripping a workpiece, turning the workpiece horizontally, and placing the workpiece; and a motion model of the numerical control machine tool 206 is cutting for 10 s, milling for 10 s, and polishing for 10 s. The preset motion model may be stored in the mobile terminal 201, the controller 203, or a cloud, or may be stored in an edge computing device near the controller 203 (not shown in the figure). The present invention does not impose a limitation on a storage location of the preset motion model. A device or node storing the preset motion model sends the preset motion model to the mobile terminal 201, or the mobile terminal 201 calls the preset motion model stored in its own memory, and the preset motion model of the robot 205 and the numerical control machine tool 206 is loaded at the mobile terminal 201.

Step 120: Receive a graphical programming instruction for a user to configure the preset motion model using the mobile terminal.

After the preset motion model of the robot 205 and the numerical control machine tool 206 is loaded at the mobile terminal 201, the user can browse the preset motion model on the mobile terminal 201. The preset motion model is a plurality of graphical functional modules and a connection between the plurality of functional modules. The user can configure the preset motion model. A process of configuring the preset motion model by the user is also referred to as a graphical programming instruction in this embodiment of the present invention, that is, the preset motion model is adaptively adjusted, to satisfy a current practical application or requirement. For example, the user adjusts a sequence of cutting and milling by dragging a cutting functional module, or taps the cutting functional module to increase a running time of the cutting functional module from 10*s* to 30*s*. The user configures the preset motion model and does not need to configure the functional modules and the connection relationship between the functional modules from scratch, which can significantly improve the efficiency of graphical programming and increase the degree of automation.

Step 130: Convert the graphical programming instruction into G-code, where the G-code is used by the controller to control the robot and the numerical control machine tool to process the workpiece.

Each functional module in the graphical programming instruction has corresponding G-code, and a mapping relationship between the functional module and the G-code may be stored in a database. Therefore, the graphical programming instruction is input, and the mapping relationship between the functional module and the G-code is called from the database, so that the graphical programming instruction can be converted into the G-code, where the G-code is used by the controller to control the robot and the numerical control machine tool to process the workpiece. The process of converting the graphical programming instruction into the G-code may be performed in the mobile terminal 201, the cloud, or the controller 203, or may be performed in the edge computing device near the controller 203. After being generated, the G-code is sent to the controller 203 by a device that generates the G-code, or is called by the processor of the controller 203. The controller 203 controls the robot 205 and the numerical control machine tool 206 according to the G-code, to process a workpiece of a desired shape and size.

In some embodiments, the programming method further includes: generating, according to the graphical programming instruction, a simulation animation corresponding to the graphical programming instruction, and sending the simulation animation to the mobile terminal for display. After the user performs graphical programming, the simulation animation is generated and displayed. The user can directly browse an execution result after the graphical programming, and at the same time check whether there are loopholes or errors in the graphical programming instruction.

In some embodiments, the programming method includes: sending the graphical programming instruction to the cloud, generating, on the cloud according to the graphical programming instruction, the simulation animation corresponding to the graphical programming instruction, and sending, by the cloud, the simulation animation to the mobile terminal for display.

Figure 4:
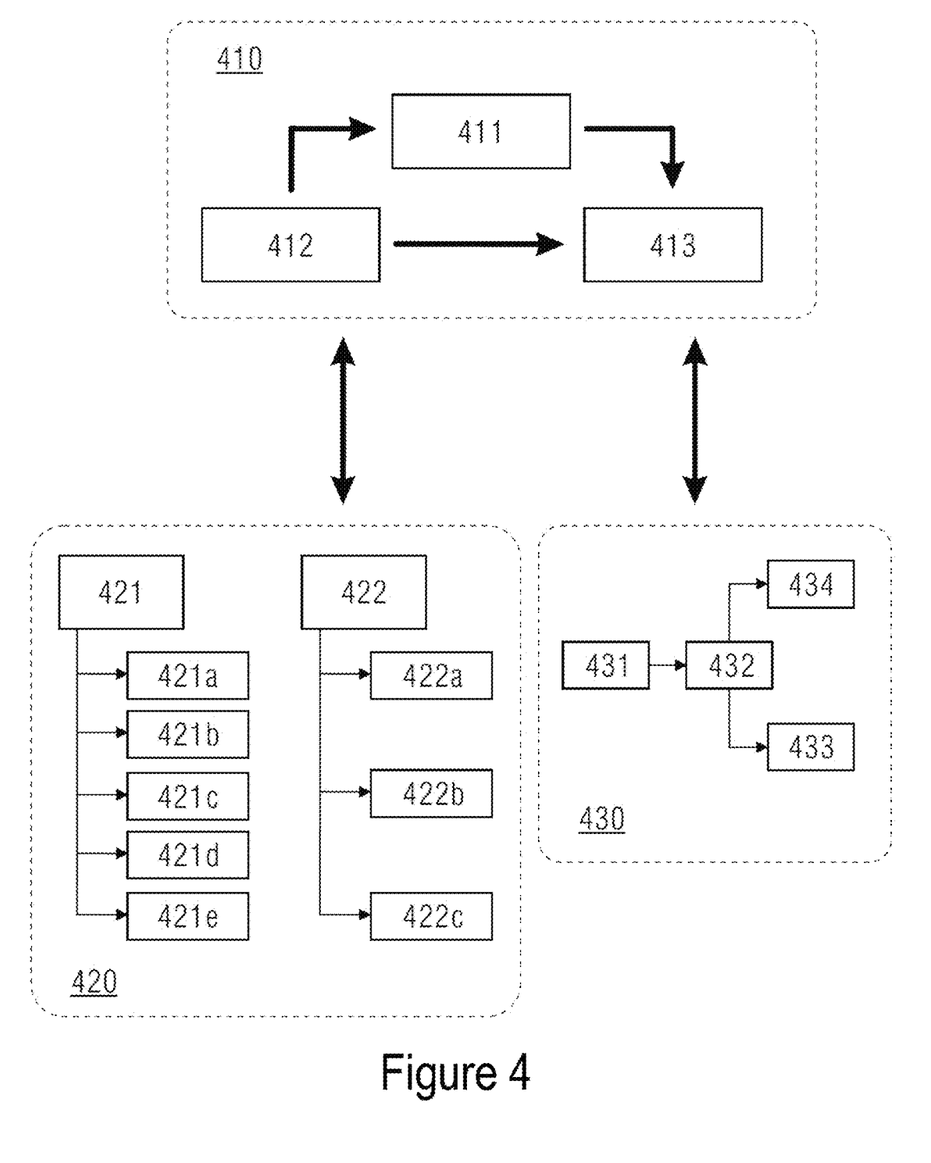
FIG. 4 is a schematic diagram of interaction between a numerical control machine tool system and a cloud according to an embodiment of the present invention.

FIG. 4 is a schematic diagram of interaction between a numerical control machine tool system and a cloud according to an embodiment of the present invention. As shown in FIG. 4, a cloud 410 can provide a computing service 411, a database service 412, and a simulation service 413. The computing service 411 calls a data model stored in the database service 412, converts a received graphical programming instruction into control code, and sends the control code to the simulation service 413. The simulation service calls the data model stored in the database service 412, and generates a simulation animation according to the received control code. So far, the cloud 410 has completed the generation of the simulation animation, and then the cloud 410 sends the generated simulation animation to the mobile terminal 420 for display. The user can directly browse, through the simulation animation, an execution result after the graphical programming. In addition, the simulation animation is generated on the cloud, and the cloud can provide massive services and computing capabilities, making the generation of the simulation animation more accurate and richer.

In some embodiments, converting the graphical programming instruction into G-code includes: in response to the user's confirmation of the simulation animation at the mobile terminal, converting the graphical programming instruction into the G-code. After browsing the simulation animation displayed on the mobile terminal, the user can adjust the graphical programming instruction based on the simulation animation until the simulation animation reaches an expected result. The introduction of the user's confirmation of the simulation animation can improve the accuracy of programming and reduce a possibility of loopholes and errors in graphical programming.

Figure 3A:
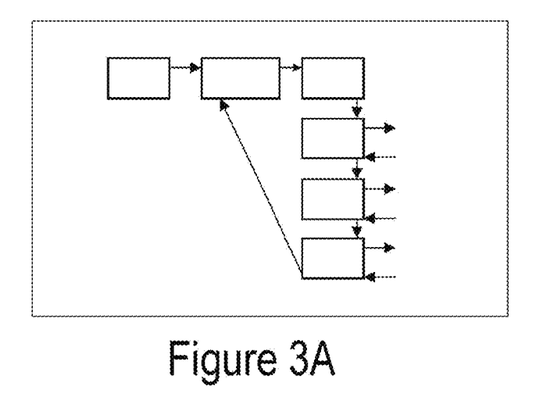
FIGS. 3A to 3C are schematic diagrams of a user interface of a mobile terminal according to an embodiment of the present invention.
Figure 3B:
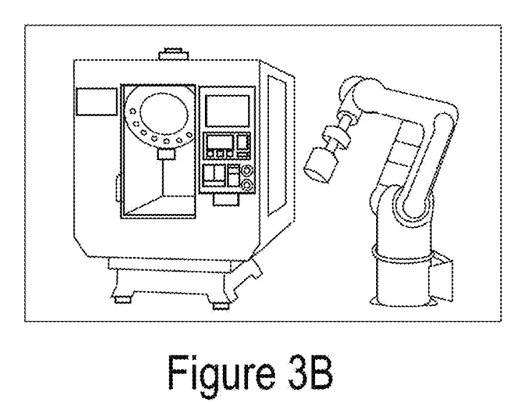
Figure 3C:
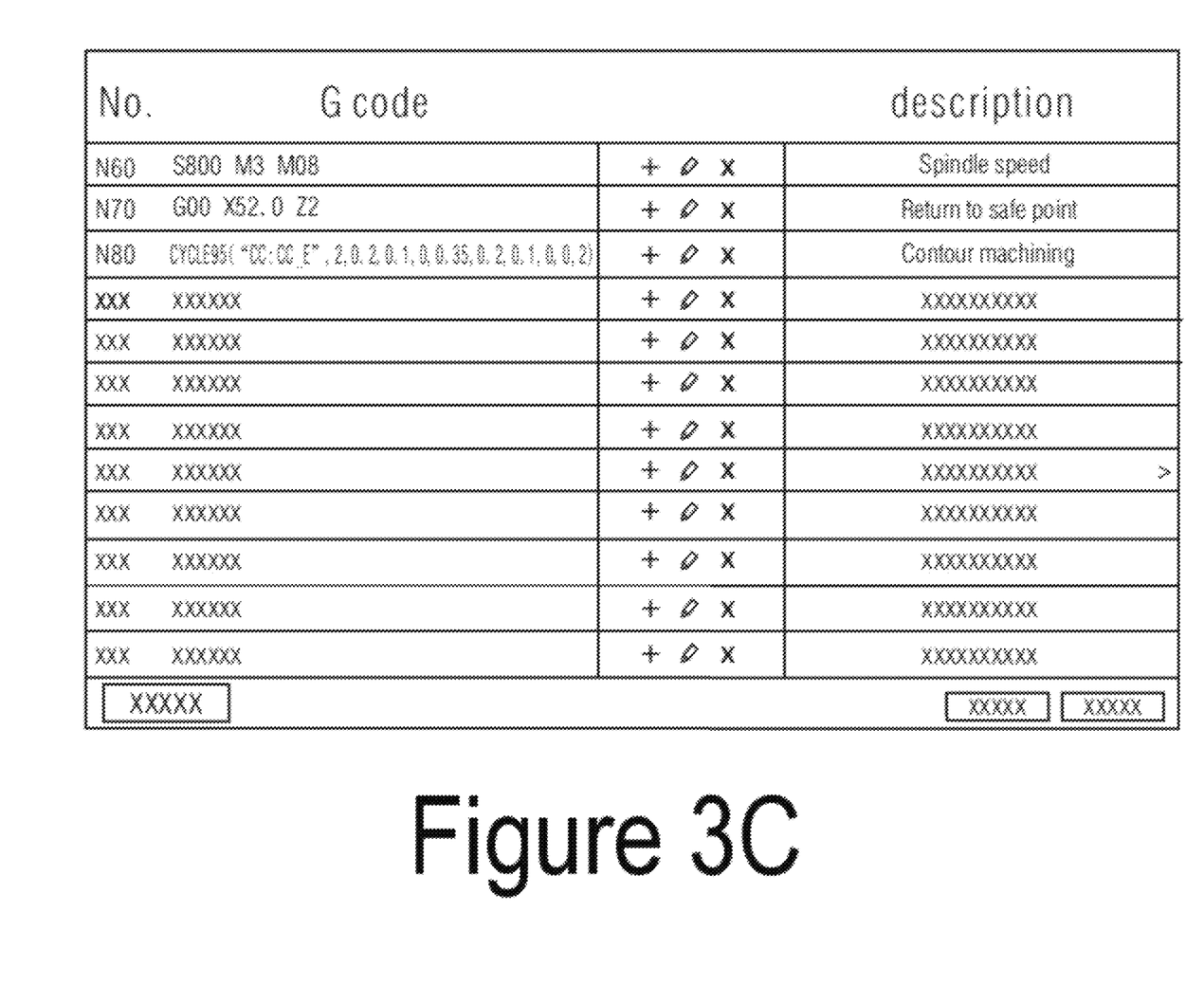

FIGS. 3A to 3C are schematic diagrams of a user interface of a mobile terminal according to an embodiment of the present invention. FIG. 3A is a schematic diagram of loading, by a mobile terminal, a preset motion model of a robot and a numerical control machine tool. As shown in FIG. 3A, the preset motion model includes a plurality of functional modules and a connection relationship between the plurality of graphical functional modules. A user can adjust, for example, by touching, content of the functional modules and the connection relationship between the functional modules, thereby implementing graphical programming. FIG. 3B is a schematic diagram of a frame of a simulation animation. As shown in FIG. 3B, in this frame, a robotic arm and a gripper are outside a numerical control machine tool, and a processing door of the numerical control machine tool is in an open state. FIG. 3C is a schematic diagram of G-code displayed on the mobile terminal. As shown in FIG. 3C, each line of G-code has a corresponding number and description. The user can add, edit, and delete the G-code in an operation area. The operations of the G-code are developed for an advanced user, and a general user only needs to perform graphical programming.

In some embodiments, the programming method further includes: obtaining a sensing signal acquired by a sensor of the robot and the numerical control machine tool; and updating the simulation animation of the robot and the numerical control machine tool based on the sensing signal. The simulation animation of the robot and the numerical control machine tool is updated based on the sensing signal, and real-time feedback and closed-loop control of the robot and the numerical control machine tool can be achieved.

In some embodiments, the numerical control machine tool system further includes an edge computing device, and the programming method includes: receiving, at the mobile terminal, the preset motion model of the robot and the numerical control machine tool that is sent by the edge computing device, generating, at the edge computing device according to the graphical programming instruction, the simulation animation corresponding to the graphical programming instruction, and sending the simulation animation to the mobile terminal for display. The preset motion model is stored on the edge computing device, and the simulation animation is generated at the edge computing device, which can reduce network latency and improve programming efficiency.

FIG. 4 is a schematic diagram of interaction between a numerical control machine tool system and a cloud according to an embodiment of the present invention. The following describes an implementation of the programming method in an embodiment of the present invention in conjunction with FIG. 4.

The cloud 410 stores the preset motion model of the robot and the CNC machine tool. The preset motion model is sent by the cloud to the mobile terminal 420, and the mobile terminal 420 loads the preset motion model. As shown in FIG. 4, the mobile terminal 420 includes a preset module 421. The preset module 421 includes preset parameters of various components, namely, a machine tool parameter module 421*a*, a robotic arm parameter module 421*b*, a gripper parameter module 421*c*, and a workpiece blank parameter module 421*d*, and an initial location parameter module 421*e*. The mobile terminal 420 further includes a graphical programming module 422. The graphical programming module 422 includes a computer numerical control technology module 422*a*, a robot motion process module 422*b*, and a simulation demonstration module 422*c*. The computer numerical control technology module 422*a* calls the parameter modules of the numerical control machine tool. The robot motion process module 422*b* calls the parameter modules of the robot, and implements graphical programming under the control of the user. A configured graphical programming instruction is sent to the cloud 410, and the cloud 410 generates a simulation animation according to the graphical programming instruction, and sends the simulation animation to the mobile terminal 420. The simulation demonstration module 422*c* of the mobile terminal 420 demonstrates the simulation animation. After the user browses and confirms the simulation animation, the graphical programming instruction is sent by the cloud 410 to a controller 431 of a field environment 430. The controller 431 converts the graphical programming instruction into G-code, and the controller 431 controls a driver 432 according to the G-code to drive a robot 433 and a numerical control machine tool 434 to process a workpiece.

This embodiment of the present invention provides the programming method for a numerical control machine tool system, in which the preset motion model of the robot and the numerical control machine tool is loaded at the mobile terminal, and the graphical programming instruction for the user to configure the preset motion model using the mobile terminal is received. The user can configure the preset motion model and does not need to configure the functional modules and the connection relationship between the functional modules from scratch, which can significantly improve the efficiency of graphical programming and increase the degree of automation.

Figure 5:
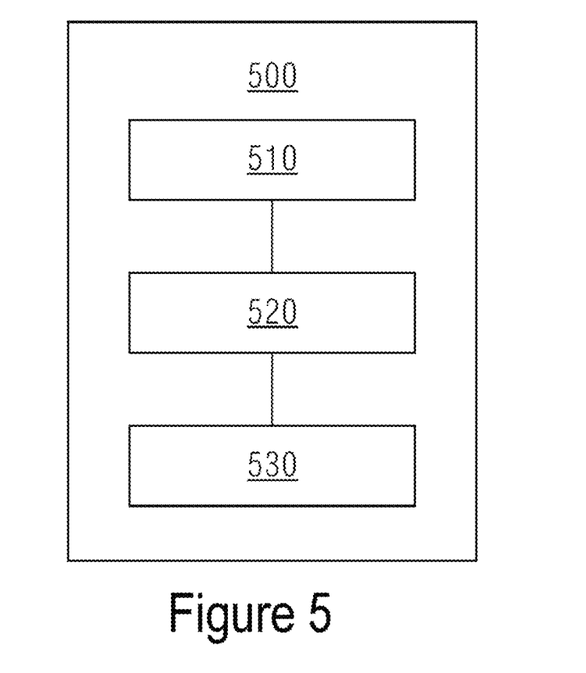
FIG. 5 is a schematic diagram of a programming apparatus for a numerical control machine tool system according to an embodiment of the present invention.

An embodiment of the present invention further proposes a programming apparatus 500 for a numerical control machine tool system, the numerical control machine tool system including a mobile terminal, a controller, a robot, and a numerical control machine tool, the mobile terminal being wirelessly connected to the controller, the controller being configured to control the robot and the numerical control machine tool, and the robot and the numerical control machine tool being configured to work cooperatively to process a workpiece. FIG. 5 is a schematic diagram of a programming apparatus 500 for a numerical control machine tool system according to an embodiment of the present invention. As shown in FIG. 5, the programming apparatus 500 includes:

a loading module 510 loading, at the mobile terminal, a preset motion model of the robot and the numerical control machine tool, where the preset motion model is a plurality of graphical functional modules and a connection between the plurality of graphical functional modules;

a receiving module 520 receiving a graphical programming instruction for a user to configure the preset motion model using the mobile terminal; and a conversion module 530 converting the graphical programming instruction into G-code, where the G-code is used by the controller to control the robot and the numerical control machine tool to process the workpiece.

In some embodiments, the programming apparatus 500 further includes: generating, according to the graphical programming instruction, a simulation animation corresponding to the graphical programming instruction, and sending the simulation animation to the mobile terminal for display.

In some embodiments, the programming apparatus 500 includes: sending the graphical programming instruction to the cloud, generating, on the cloud according to the graphical programming instruction, the simulation animation corresponding to the graphical programming instruction, and sending, by the cloud, the simulation animation to the mobile terminal for display.

In some embodiments, the conversion module 530 converting the graphical programming instruction into G-code includes: in response to the user's confirmation of the simulation animation at the mobile terminal, converting the graphical programming instruction into the G-code.

In some embodiments, the programming apparatus 500 further includes: obtaining a sensing signal acquired by a sensor of the robot and the numerical control machine tool; and updating the simulation animation of the robot and the numerical control machine tool based on the sensing signal.

In some embodiments, the numerical control machine tool system further includes an edge computing device, and the programming apparatus 500 includes: receiving, at the mobile terminal, the preset motion model of the robot and the numerical control machine tool that is sent by the edge computing device, generating, at the edge computing device according to the graphical programming instruction, the simulation animation corresponding to the graphical programming instruction, and sending the simulation animation to the mobile terminal for display.

Figure 6:
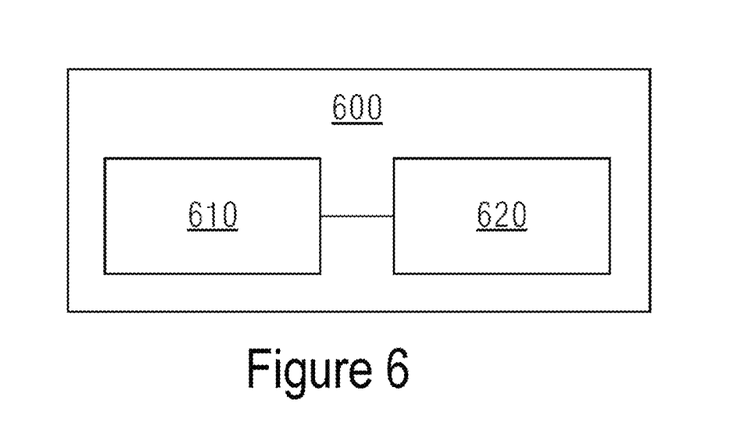
FIG. 6 is a schematic diagram of an electronic device according to an embodiment of the present invention.

An embodiment of the present invention further proposes an electronic device 600. FIG. 6 is a schematic diagram of an electronic device 600 according to an embodiment of the present invention. As shown in FIG. 6, the electronic device 600 includes a processor 610 and a memory 620, and the memory 620 has instructions stored thereon, where when the instructions are executed by the processor 610, a method 100 as described above, or of another embodiment, is implemented.

An embodiment of the present invention further proposes a computer-readable storage medium having computer instructions stored thereon, where when the computer instructions are run, a method 100 as described above, or of another embodiment, is performed.

Some aspects of the method and apparatus of the present invention may be completely executed by hardware, or may be completely executed by software (including firmware, resident software, microcode, etc.), or may be executed by a combination of hardware and software. The hardware or software described above may all be referred to as "data block", "module", "engine", "unit", "component", or "system". The processor may be one or more application-specific integrated circuits (ASICs), digital signal processors (DSPs), digital signal processing devices (DSPDs), programmable logic devices (PLDs), field-programmable gate arrays (FPGAs), processors, controllers, microcontrollers, microprocessors, or a combination thereof. In addition, various aspects of the present invention may be embodied as a computer product in one or more computer-readable media, and the product includes computer-readable program code. For example, the computer-readable media may include, but are not limited to, a magnetic storage device (for example, a hard disk, a floppy disk, a tape . . . ), an optical disc (for example, a compact disc (CD), a digital versatile disc (DVD) . . . ), a smart card, and a flash memory device (for example, a card, a stick, a key drive . . . ).

A flowchart is used herein to illustrate the operations performed in the method according to the embodiments of the present application. It should be understood that the operations described above are not necessarily performed exactly in order. Instead, the various steps may be processed in reverse order or simultaneously. In addition, other operations are added to these processes, or a certain step or several operations are removed from these processes.

It should be understood that, although the specification is described according to various embodiments, not each of the embodiments only contains one independent technical solution. This description of the specification is merely for the sake of clarity. Those skilled in the art should take the specification as a whole, and the technical solutions in the various embodiments may also be combined appropriately to form other implementations which can be understood by those skilled in the art.

The foregoing description is merely illustrative of specific implementations of the present invention, and is not intended to limit the scope of the present invention. Any equivalent changes, modifications, and combinations made by any persons skilled in the art without departing from the concept and principle of the present invention shall fall within the scope of protection of the present patent.

Of course, the embodiments of the method according to the invention and the imaging apparatus according to the invention described here should be understood as being example. Therefore, individual embodiments may be expanded by features of other embodiments. In particular, the sequence of the method steps of the method according to the invention should be understood as being example. The individual steps can also be performed in a different order or overlap partially or completely in terms of time.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A programming method for a numerical control machine tool system, the numerical control machine tool system including a mobile terminal, a controller, a robot, and a numerical control machine tool, the mobile terminal being wirelessly connected to the controller, the controller being configured to control the robot and the numerical control machine tool, and the robot and the numerical control machine tool being configured to work cooperatively to process a workpiece, wherein the programming method comprises:
  collecting motion data of the robot and the numerical control machine tool in different modes;
  constructing a preset motion model based on the collected motion data of the robot and the numerical control machine tool in different modes;
  loading, at the mobile terminal, the preset motion model of the robot and the numerical control machine tool, the preset motion model being a plurality of graphical functional modules and a connection between the plurality of graphical functional modules;
receiving a graphical programming instruction from a user that adjusts the preset motion model using the mobile terminal;
sending the graphical programming instruction to a cloud;
generating a simulation animation based on the graphical programming instruction;
receiving, from the cloud, the simulation animation;
displaying the simulation animation; and
converting the graphical programming instruction into G-code, wherein the G-code is usable by the controller to control the robot and the numerical control machine tool to process the workpiece.

2. The programming method of claim 1, wherein the converting of the graphical programming instruction into G-code comprises:
converting, in response to confirmation of the user of the simulation animation at the mobile terminal, the graphical programming instruction into the G-code.

3. The programming method of claim 1, further comprising:
obtaining a sensing signal acquired by at least one of the robot or the numerical control machine tool; and
updating the simulation animation of the robot and the numerical control machine tool based on the sensing signal.

4. A non-transitory computer-readable storage medium storing computer instructions, wherein upon the computer instructions being run, the programming method of claim 1 is performed.

5. The programming method of claim 1, wherein the cloud is configured to generate the simulation animation based on the graphical programming instruction prior to generation of the G-code.

6. The programming method of claim 1, wherein the cloud is configured to generate the simulation animation based on the graphical programming instruction prior to generation of code usable by the controller to control the robot and the numerical control machine tool.

7. The programming method of claim 1, wherein the receiving the graphical programming instruction from the user includes receiving at least adjustment of the preset motion model, the at least one adjustment including at least one of:
adjusting a sequence of the preset motion model; or
adjusting a running time of a functional module of the preset motion model.

8. The programming method of claim 7, wherein the receiving the graphical programming instruction from the user does not include configuring a connection relationship between functional modules of the preset motion model.

9. The programming method of claim 1, further comprising:
receiving the preset motion model from the cloud.

10. A programming apparatus for a numerical control machine tool system, the numerical control machine tool system including a mobile terminal, a controller, a robot, and a numerical control machine tool, the mobile terminal being wirelessly connected to the controller, the controller being configured to control the robot and the numerical control machine tool, and the robot and the numerical control machine tool being configured to work cooperatively to process a workpiece, wherein the programming apparatus comprises:
a collecting circuit configured to collect motion data of the robot and the numerical control machine tool in different modes;
a constructing circuit configured to construct a preset motion model based on the collected motion data of the robot and the numerical control machine tool in different modes;
a loading circuit configured to load, at the mobile terminal, the preset motion model of the robot and the numerical control machine tool, the preset motion model being a plurality of graphical functional modules and a connection between the plurality of graphical functional modules;
a receiving circuit configured to receive a graphical programming instruction from a user that adjusts the preset motion model using the mobile terminal;
a communication circuit configured to
generate a simulation animation based on the graphical programming instruction by transmitting the graphical programming instruction to a cloud and receiving the simulation animation from the cloud; and
a conversion circuit configured to convert the graphical programming instruction into G-code, the G-code being usable by the controller to control the robot and the numerical control machine tool to process the workpiece.

11. The programming apparatus of claim 10, wherein the conversion circuit is further configured to:
convert, in response to the user confirming the simulation animation at the mobile terminal, the graphical programming instruction into the G-code.

12. The programming apparatus of claim 10, wherein the programming apparatus further comprises:
an updating circuit configured to
obtain a sensing signal acquired by at least one of the robot or the numerical control machine tool; and
update the simulation animation of the robot and the numerical control machine tool based on the sensing signal.

13. An electronic device, comprising:
a processor;
a memory storing instructions, wherein upon the instructions being executed by the processor, a method is implemented comprising:
collecting motion data of a robot and a numerical control machine tool in different modes;
constructing a preset motion model based on the collected motion data of the robot and the numerical control machine tool in different modes;
loading, at a mobile terminal, the preset motion model of the robot and the numerical control machine tool, the preset motion model being a plurality of graphical functional modules and a connection between the plurality of graphical functional modules;
receiving a graphical programming instruction from a user that adjusts the preset motion model using the mobile terminal;
generating a simulation animation based on the graphical programming instruction by sending the graphical programming instruction to a cloud and receiving the simulation animation from the cloud;
displaying the simulation animation; and
converting the graphical programming instruction into G-code, wherein the G-code is usable by a controller to control the robot and the numerical control machine tool to process a workpiece.

* * * * *